Aug. 11, 1936.   C. GOTTWALD ET AL   2,050,968
CONDUIT CONSTRUCTION
Filed March 25, 1933   2 Sheets-Sheet 1
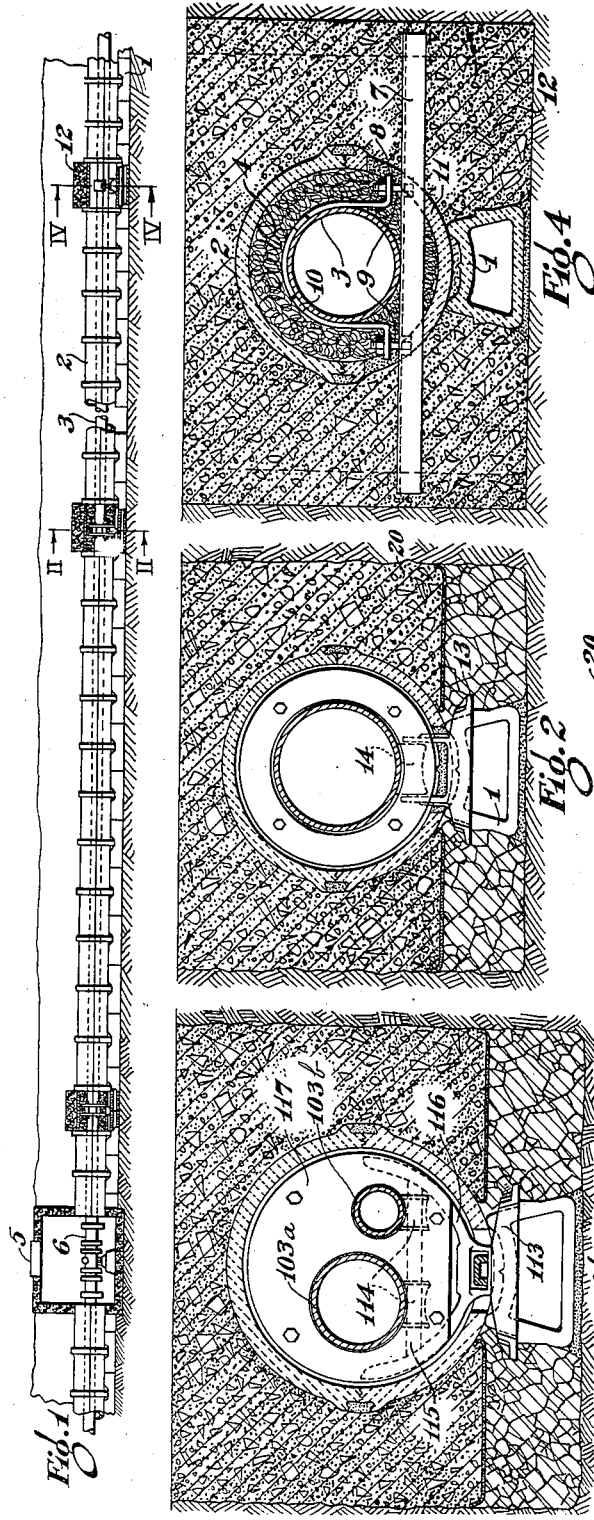
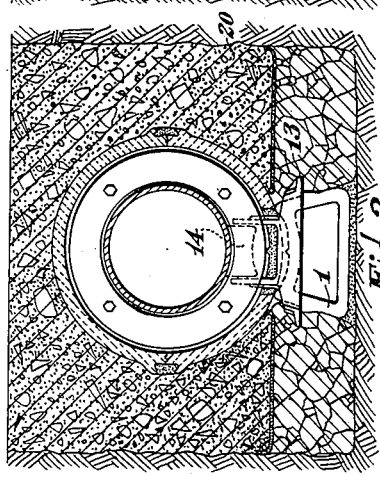
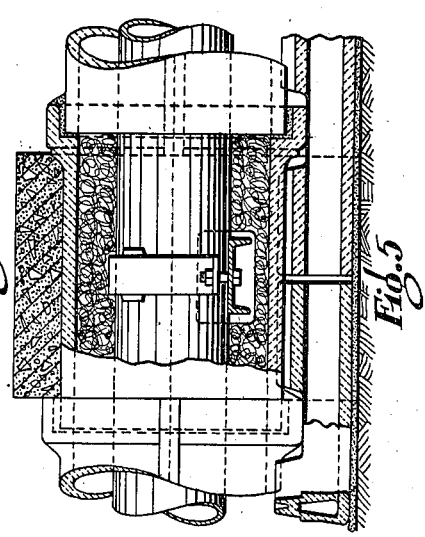
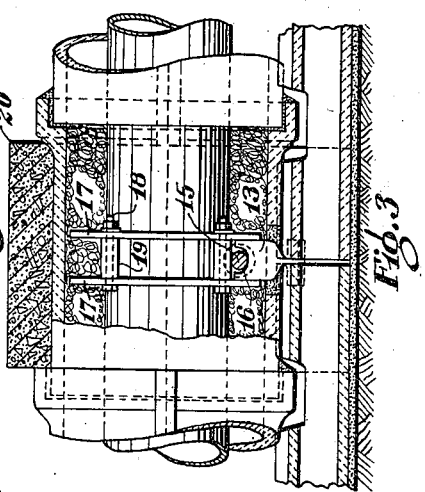
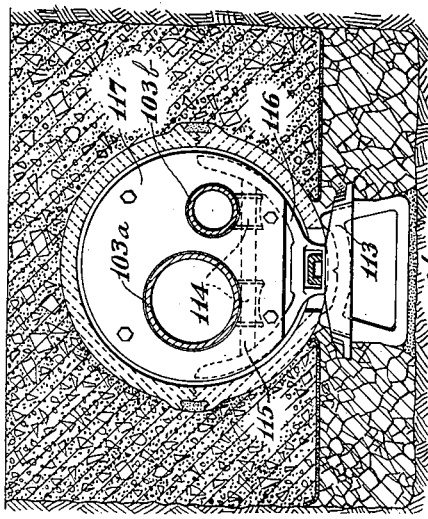
INVENTORS
William S. McLeishey
Christian Gottwald
BY
Hawgood and Van Horn
ATTORNEYS Aug. 11, 1936.  C. GOTTWALD ET AL  2,050,968
CONDUIT CONSTRUCTION
Filed March 25, 1933  2 Sheets-Sheet 2

Patented Aug. 11, 1936

2,050,968

UNITED STATES PATENT OFFICE 2,050,968

CONDUIT CONSTRUCTION

Christian Gottwald, Cleveland Heights, Ohio, and William S. McLeish, New York, N. Y., assignors to The Ric-wil Company, Cleveland, Ohio, a corporation of Ohio Application March 25, 1933, Serial No. 662,770

6 Claims. (Cl. 138—48)

This invention relates to conduit construction and more particularly to a construction which is adapted to conduits subjected to variations in temperature.

An object of the invention is to provide an improved conduit construction in which one or more pipes may be maintained in axial alignment within a casing and allowed to expand or contract longitudinally.

Another object is to provide an improved conduit construction which will be simple and rugged in construction.

Another object is to provide an improved conduit which may be easily and economically installed.

Other objects will hereinafter appear.

The invention will be better understood from the description of several practical embodiments thereof illustrated in the accompanying drawings, in which;

Figure 1 is a side elevational view partly in section showing a portion of a subterranean conduit installation;

Figure 2 is a cross-sectional view taken on the line II—II of Figure 1 to an enlarged scale;

Figure 3 is a side elevational view of the parts shown in Figure 2, parts being shown in section;

Figure 4 is a cross-sectional view taken on the line IV—IV of Figure 1 to an enlarged scale;

Figure 5 is a side elevational view of the parts shown in Figure 4, some parts being broken away and some being shown in section;

Figure 6 is a view similar to Figure 2 of an installation for two pipes of different diameter;

Figure 7:
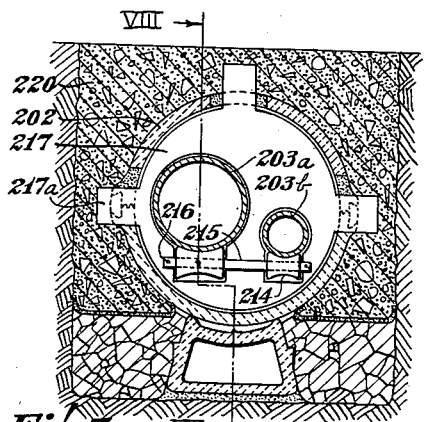
Figure 7 is a transverse view similar to Figures 2 and 6 but showing a modified type of pipe support.

Referring first to Figure 1, a conduit system is illustrated which comprises a row of base drain tiles 1 which are arranged along the bottom of a trench. Upon these tiles are arranged a series of tubular sections 2 of either ceramic material or of metal, and centrally within the casing so formed is a fluid-conducting pipe 3, the space between the pipe and the casing serving to enclose heat-insulating material 4. At intervals, the conduit is provided with manholes 5 in which are positioned expansion joints 6, and intermediate the expansion joints the pipe 3 is anchored, so that, upon an increase in temperature, it expands in both directions away from its anchorage and toward the joints 6.

One form of anchorage is illustrated in Figures 4 and 5 and consists of a channel-shaped bar 7 clamped to the pipe by means of a strap 8 and bolts 9, the strap, and also the channel bar, if desired, being secured to the pipe by welding 10. The anchors may be simplified by welding the channel bar directly to the pipe and omitting the strap and bolts. Both ends of the channel bar extend considerably beyond the casing 2, passing through holes or notches 11 in the lower section of this casing, and the entire section including the base drain 1 is embedded in a block 12 of concrete or the like. At this point, it will be apparent that the pipe is firmly held both against axial movement and in a central position within the casing.

At various points along the conduit are positioned supports for the pipe, and in order to maintain it in alignment within the casing, some of these supports, as shown in Figures 2 and 3, are provided with guide means. As shown in these figures, the support consists of a saddle-like member 13 which rests upon the base drain 1 and which is provided with a roller 14 supported by trunnions 15 resting in notches 16 upon the saddle-like member 13. Clamped to the member 13 are two circular plates or discs 17 held in substantially parallel relation by bolts 18 and spacers 19, these discs being centrally apertured to permit passage of the pipe therethrough.

If, for instance, the distance from anchorage block 12 to manhole 5 is 150 feet, one of these guides will be installed about 6 feet from the manhole, and another about 30 feet from the manhole, as two guides so positioned have been found adequate to take care of any tendency in the pipe to bend or buckle upon such expansion as occurs in steam or refrigeration lines.

The conduit is surrounded at the points where the spacing devices are placed with blocks of concrete 20, which anchor the casing so that if the spacers are forced against the same it will not be moved or broken.

In Figure 6 a saddle-like member 113 is provided this having upwardly curving arms 116 supporting a transverse shaft 115 carrying two rollers 114. Two pipes 103a and 103b are supported by these rollers and pass through spaced apertures in plates 117.

Figure 8:
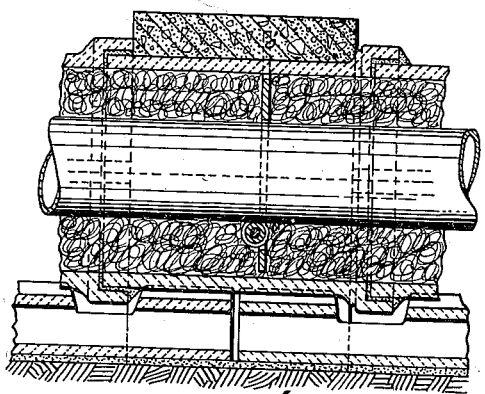
Figure 8 is a fragmentary view similar to Figure 3, partly in section, corresponding to line VIII—VIII of Fig. 7.

In Figures 7 and 8, a pipe support is illustrated formed of a plate 217 having lugs 217a which project through the casing 202 and are embedded, and thus securely held, within the concrete block 220. This plate is provided with two perforations to permit the passage of pipes 203a and 203b, which pipes are supported upon rollers 214 carried by a shaft 215 secured to the plate as by rivets 216.

Figure 9:
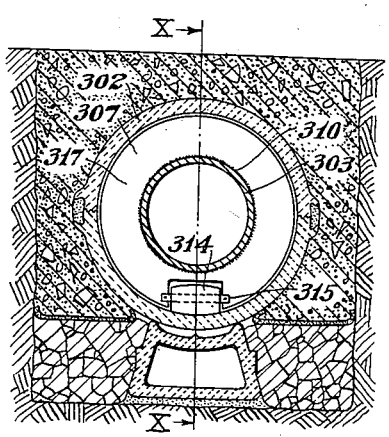
Figure 9 is a view similar to Figures 2, 6 and 7 but showing another embodiment of the invention.
Figure 10:
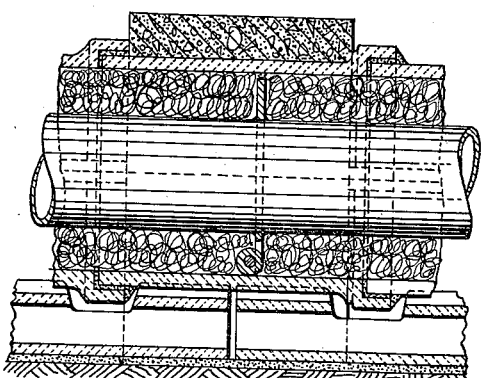
Figure 10 is a view corresponding to Figures 3 and 8, parts being shown in section, taken on line X—X of Figure 9.

In Figures 9 and 10, a circular plate 317, provided with a central aperture, is secured to the exterior of the pipe 303 by welding 310 and moves with the pipe as the latter expands or contracts. To eliminate friction between this plate and the casing 302, a roller 314, rotatably mounted on a shaft 315, is provided, this shaft being fastened as by riveting or welding to the plate 317 and the plate being notched to accommodate the roller, as shown.

Figure 11:
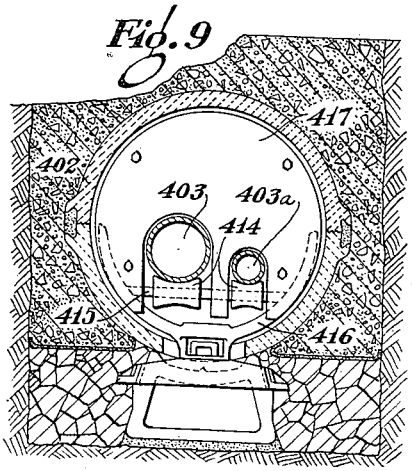
Figure 11 is a view similar to Figures 2, 6, 7 and 9 showing another embodiment of the invention.

In Figure 11 the parts shown are identical to those of Figure 6 excepting that the plate 417 is provided with two U-shaped apertures extending to its lower edge instead of circular apertures closely surrounding the pipes 403 and 403a. With a plate of this shape the pipes may be first placed in position and the plate spread down over them and secured to the cradle 416. The rollers 414 upon the shaft 415 supported by the cradle prevent the downward displacement of the pipes so that the open bottoms of the aperture do not effect the proper holding of these pipes.

While we have described the illustrated embodiments of our invention in some particularity, obviously many others will readily occur to those skilled in this art, and we do not, therefore, limit ourselves to the precise details shown and described but claim as our invention all embodiments, variations and modifications thereof coming within the scope of the appended claims.

We claim:

1. A guide for conduit systems which consist of a pipe within a casing and drainage means beneath said casing, which comprises a support resting upon said drainage means, a roller carried by said support and arranged to support said pipe within the casing, and a partition extending transversely of the pipe and casing carried by said support.

2. A conduit system comprising a fluid conducting pipe, a casing surrounding and spaced from said pipe, and a guide comprising a flat plate interposed between said pipe and said casing and extending substantially the entire distance from the pipe to the casing above and at both sides of the pipe.

3. A conduit system comprising a fluid conducting pipe, a casing surrounding and spaced from said pipe, a guide comprising a flat plate interposed between said pipe and said casing and extending substantially the entire distance from the pipe to the casing above and at both sides of the pipe, and an antifriction support connected to said guide and engaging one of the two first mentioned members.

4. A conduit system comprising a fluid conducting pipe, a casing surrounding and spaced from said pipe, and a guide comprising a flat plate adapted to fit transversely within said casing and about said pipe, the plate extending substantially from the pipe to the casing at both sides and above the pipe, and a roller pivotally mounted on said plate.

5. A guide for use in a conduit system having a fluid conducting pipe within a casing, the guide comprising a flat rigid sheet of shape and size to fit substantially within and across the casing and extending substantially from side to side and to substantially the top thereof, an aperture in said guide substantially fitting the exterior of the pipe, a bearing secured to said guide, and a roller on said bearing in contact with the underside of said pipe.

6. A guide for use in a conduit system having a fluid conducting pipe within a casing, the guide comprising a flat rigid sheet of shape and size to fit substantially within and across the casing and extending substantially from side to side and to substantially the top thereof, an aperture in said guide substantially fitting the exterior of the pipe, a bearing secured to said guide, and a roller on said bearing in contact with the bottom of said casing.

WILLIAM S. McLEISH.
CHRISTIAN GOTTWALD.